(No Model.)

F. SPLITTSTOSER.
HOOK.

No. 410,461. Patented Sept. 3, 1889.

Witnesses:
E. P. Ellis,
J. M. Nesbit

Inventor:
Ferdinand Splittstoser,
per
F. A. Lehmann,
Atty.

UNITED STATES PATENT OFFICE.

FERDINAND SPLITTSTOSER, OF NORTH BRANCH, MINNESOTA.

HOOK.

SPECIFICATION forming part of Letters Patent No. 410,461, dated September 3, 1889.

Application filed April 29, 1889. Serial No. 309,000. (No model.)

*To all whom it may concern:*

Be it known that I, FERDINAND SPLITTSTOSER, of North Branch, in the county of Isanti and State of Minnesota, have invented certain new and useful Improvements in Hooks; and I do hereby declare the following to be a full, clear, and exact description of the invention, such as will enable others skilled in the art to which it pertains to make and use it, reference being had to the accompanying drawings, which form part of this specification.

My invention relates to an improvement in hooks which are designed to be used in connection with plow-clevises, harness, and wherever a hook of this nature is needed; and the object of my invention is to provide a hook with a spring-actuated latch so that the latch will remain either in an open or closed position, as the operator may desire.

Figure 1:
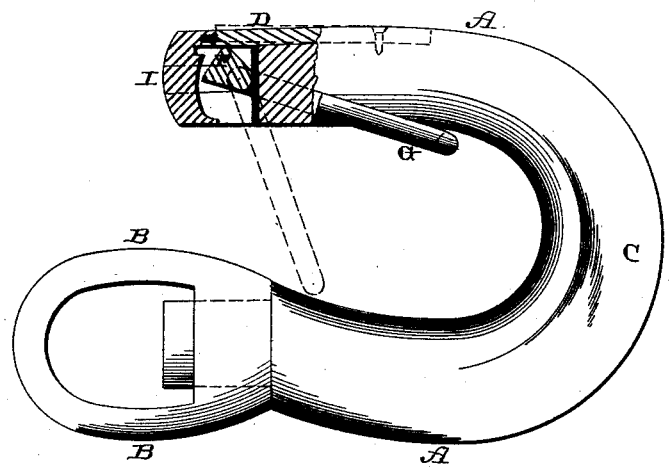
Figure 2:
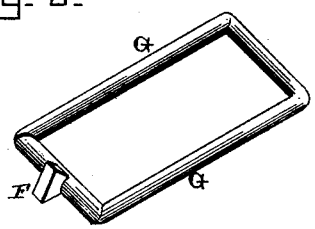
Figure 3:
Figure 4:
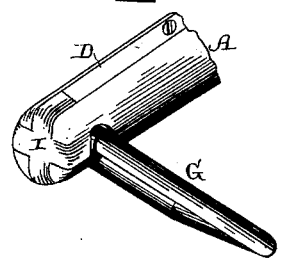

Figure 1 is a side elevation of a hook which embodies my invention, partly in section. Fig. 2 is a perspective of the latch alone. Fig. 3 is a perspective of the casting placed in the end of the hook for holding the latch in position. Fig. 4 is a perspective of the upper end of the hook and latch.

A represents a hook, which is either swiveled in or rigidly secured to the eye B, as may be desired. This eye serves as a means of attachment to a chain, ring, or other object to which the hook is to be fastened. The sides of the hook at its front portion are flattened away, as shown at C, thereby giving to the hook a greater breadth or thickness at this point where the wear and strain come upon it, so as to give it a greater strength and wearing capacity than it would have if the hook were made round at this point in the usual manner.

In the upper end of the hook is formed a suitable recess, into which the upper end of the latch is placed and recessed. In the top portion of this hook is a flat spring D, the outer free end of which bears upon the cam or projection F, formed on the upper end of the latch G, as shown. The latch is of ordinary construction, and drops down upon the lower portion of the hook, so as to prevent the chain, ring, or strap, which is fastened in the hook, from becoming detached therefrom, and the projection upon its upper end is shaped as shown, so that the pressure of the spring will hold the latch either in a raised or a closed position, as may be desired. While the operator is adjusting the different parts the latch will be held in a raised position by the pressure of the spring upon the projection upon its upper end; but after the latch has once been dropped downward and closed the pressure of the spring will keep it in position. This latch is kept in place in the end of the hook by the casting I, which has four prongs and which fit in correspondingly-shaped recesses formed in the end of the hook to receive them. This casting serves to keep the latch from becoming detached from the hook, although it allows the latch to be freely operated. This casting may be riveted or otherwise fastened in the end of the hook, as may be desired.

Having thus described my invention, I claim—

1. The combination of the hook having a recess formed in its top and a recess formed in its end, and the casting placed in the recess in the end of the hook, with the spring placed in the top of the hook, and the latch provided with a projection upon one end, against which the free end of the spring bears, whereby the spring serves to hold the latch either in an open or closed position, substantially as described.

2. The combination of the hook having a longitudinal recess formed in its top and a horizontal and vertical recess formed in its end, with the casting shaped to fit and placed in the end recesses, the spring placed in the top recess with its rear end rigidly secured therein, and the latch placed in the horizontal recess and provided with a projection upon its upper end, against which the free end of the spring bears, substantially as shown and described.

In testimony whereof I affix my signature in presence of two witnesses.

FERDINAND SPLITTSTOSER.

Witnesses:
GEO. C. STARR,
WM. W. SHULEAR.